United States Patent [19]

West et al.

[11] Patent Number: 4,968,914

[45] Date of Patent: Nov. 6, 1990

[54] HIGH RESOLUTION ELECTROMECHANICAL TRANSLATION DEVICE

[75] Inventors: Paul E. West, Glendale; Arthur Young, Temple City, both of Calif.

[73] Assignee: Quanscan, Inc., Pasadena, Calif.

[21] Appl. No.: 328,429

[22] Filed: Mar. 24, 1989

[51] Int. Cl.$^5$ .......................................... H01L 41/08
[52] U.S. Cl. ..................................... 310/328; 310/317
[58] Field of Search ...................... 310/328, 316, 317

[56] References Cited

U.S. PATENT DOCUMENTS

| | | | |
|---|---|---|---|
| 3,377,489 | 4/1968 | Brisbane | 310/8.3 |
| 3,684,904 | 8/1972 | Galutva et al. | 310/8.0 |
| 4,163,168 | 7/1979 | Ishikawa et al. | 310/328 |
| 4,343,993 | 8/1982 | Binning et al. | 250/306 |
| 4,422,002 | 12/1983 | Binnig et al. | 310/328 |
| 4,651,046 | 3/1987 | Ohya et al. | 310/328 |
| 4,709,183 | 11/1987 | Lang | 310/328 |

*Primary Examiner*—Mark O. Budd
*Attorney, Agent, or Firm*—Fulwider, Patton, Lee & Utecht

[57] ABSTRACT

The electromechanical translation apparatus includes a translation drive assembly driven by front and rear piezoelectric clamping members coupled together with central extension piezoelectric members, which negotiate an elongated stationary channel. The translation drive assembly may directly carry an object for precise linear positioning in one dimension, or may carry a movable channel which in turn may be translated along an axis perpendicular to the direction of the stationary channel, so that an object placed upon the movable channel can be precisely positioned in two dimensions.

7 Claims, 6 Drawing Sheets

HIGH RESOLUTION ELECTROMECHANICAL TRANSLATION DEVICE

BACKGROUND OF THE INVENTION

1. Field of the Invention

This invention relates generally to electromechanical translation devices, and more particularly relates to an apparatus for high resolution translation in one or two dimensions that is particularly useful, for example, in high resolution positioning instruments such as microscopes and optical instruments.

2. Description of Related Art

Various devices for precise linear or two dimensional motion, such as are useful in a scanning device, are known in the art. Electromechanical transducers such as piezoelectric ceramic laminates which expand upon being subjected to an electrical current have been used for controlling the position of machine tools. Piezoelectric ceramic laminates or stacks have also been coupled between parallel plates in such a fashion that two-dimensional motion of the control devices is possible. Stepwise fine positioning adjustment is also possible when piezoelectric stacks are combined for "walking" over a flat substrate. A channel walking device fitting in grooves in the channel for translation at cryogenic temperatures is known. A piezoelectric translating device for carrying and moving a flat plate in either one or two dimensions is also known.

It would be desirable to provide a positioning apparatus which travels within a stationary, rectilinear channel, to insure precise translational motion of the device. It would also be desirable to provide a high resolution two-dimensional positioning apparatus having support surfaces which have less total area than the total two-dimensional scanning area, in order to reduce the time and expense of precision machining of the substrate surfaces over which the positioning device travels. The present invention fulfills these needs.

SUMMARY OF THE INVENTION

The present invention provides an electromechanical translation apparatus having a translational drive assembly driven by front and rear clamping members, coupled together with central extension members which negotiate an elongated stationary channel, thereby providing a simple yet highly precise way of positioning objects, with a minimum of rotational and linear error. The translation drive assembly may directly carry an object for precise linear positioning in one dimension, or may carry a movable channel which in turn may be translated along an axis perpendicular to the axis of the stationary channel, so that an object placed upon the movable channel can be precisely positioned in two dimensions. The two-dimensional translator embodiment will not only present less total surface area to be machined than the total two-dimensional scanning area, to reduce the time and expense of machining in the manufacture of the bearing surfaces, but will also reduce the potential for positional errors due to imperfections in the surfaces.

Briefly and in general terms, the translation apparatus according to the invention includes a channel having opposing interior bearing surfaces, and a translation drive assembly which negotiates the channel. The translation drive assembly in its simplest form includes at least two clamping members including at least one expansion member and extending between the bearing surfaces of the channel, and a central drive including at least one expansion member coupling the clamping drive members. Each of the expansion members is responsive to an electrical control signal so that each expansion member may be selectively expanded or contracted in a predetermined sequence to cause the translation drive assembly to negotiate the stationary channel.

In a currently preferred embodiment of the invention, each of the expansion members comprises a piezoelectric transducer. The invention preferably includes a movable channel similar to the stationary channel member which is carried by the translation drive assembly for movement along an axis perpendicular to the axis of orientation of the stationary channel member, to provide two-dimensional translational motion of the movable channel member.

The translation assembly is also preferably constructed with symmetrically distributed pairs of expansion members so that the clamping members comprise a front pair and a rear pair of expansion members coupled by a front pair and a rear pair of central expansion members mounted on a central body. Each of the front, rear, and central groups of expansion members are preferably selectively actuatable by electrical control signals according to a predetermined logic sequence. This construction allows a unique scanning-in-place motion of the translation assembly and the movable channel.

Other aspects and advantages of the invention will become apparent from the following detailed description, and the accompanying draWings, illustrating by way of example the features of the invention.

DETAILED DESCRIPTION OF THE INVENTION

Figure 1:
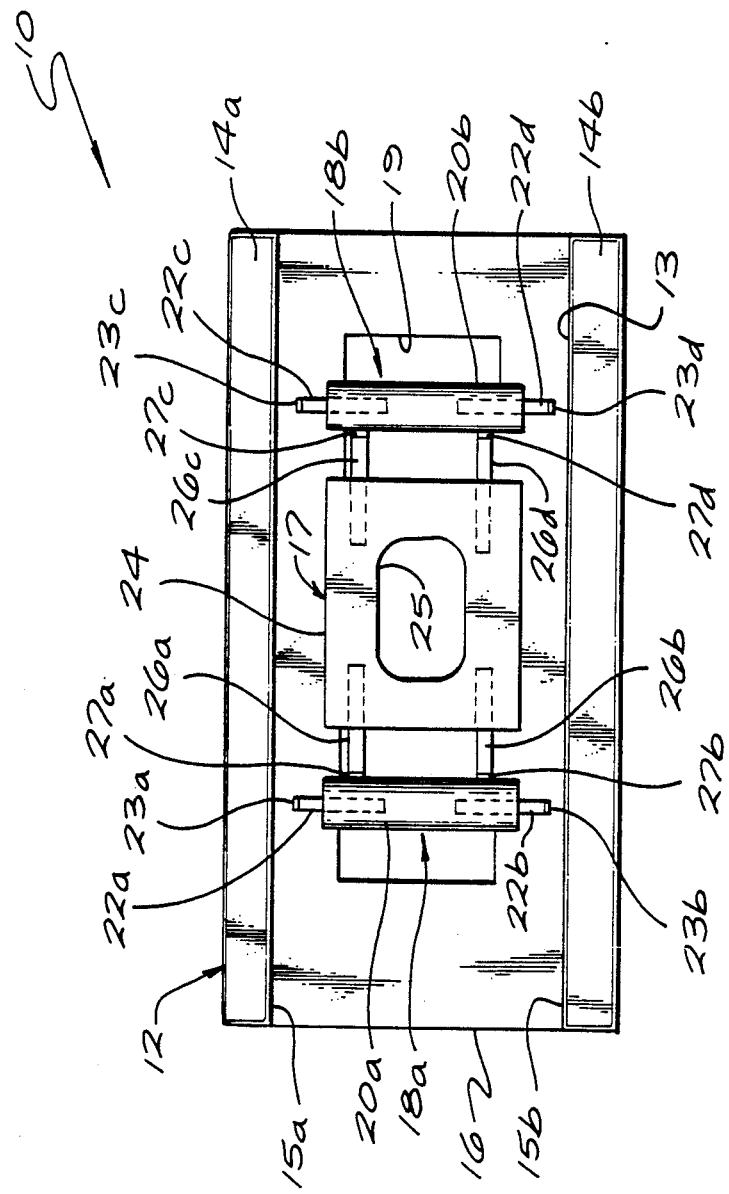
FIG. 1 is a top plan view of a one-dimensional translator in a stationary channel.

As is shown in the drawings for purposes of illustration, the invention is embodied in an electromechanical translation apparatus such as is suitable for positioning a high resolution one-dimensional or two-dimensional translation stage such as may be used with high resolution microscopes. A particular use for the invention is for a one-dimensional or two-dimensional translational stage for a scanning tunneling microscope. Such microscopes are useful for imaging objects as small as atoms, so that there is a need for a stable translational positioning apparatus capable of positioning an object with extremely high resolution in either one or two dimensions. There is also need for reduction of time, costs, and positional errors from the machining of bearing surfaces for such translational devices, which have frequently involved placement of a positioning device between grooved and highly smoothed, machined parallel plates. The translation apparatus of the present invention provides readily machined pathways for one dimensional or two dimensional travel for precise positioning of the translation apparatus with a minimum of linear or rotational error.

In accordance with the invention, there is provided an electromechanical translation apparatus, comprising a channel member having opposing interior bearing surfaces; and a translation drive assembly disposed between the bearing surfaces including first and second clamping members each including a plurality of expansion members and extending in a first direction between the bearing surfaces; and central drive means coupling the clamping members together and including at least one first central expansion member and at least one second central expansion member extending in a second direction perpendicular to the first direction; each of the expansion members being selectively actuatable to expand and contract responsive to electrical control signals; so that the translation drive assembly is capable of linear translational movement along the stationary channel member.

The invention also provides for an electromechanical translation apparatus, comprising a channel member having opposing interior bearing surfaces; a translation drive assembly carried by the channel member and disposed between the bearing surfaces, the translation drive assembly including at least two primary clamping members each including at least one expansion member and extending in a first direction between the bearing surfaces; the translation drive assembly including central drive means coupling the primary clamping members together and including at least one expansion member extending in a second direction perpendicular to the first direction; each of the expansion members being selectively actuatable to expand and contract in response to electrical control signals; a movable channel member having opposing interior bearing surfaces; the translation drive assembly being disposed between the movable channel member bearing surfaces and carrying the movable channel member; the central drive means further including at least one secondary expansion member extending in the first direction, and at least two secondary clamping expansion members each extending in the second direction coupled together by the secondary central expansion member; so that the movable channel member is capable of translational motion in two dimensions.

As is shown in the drawings, the simplest exemplary embodiment of the invention is as a one-dimensional electromechanical translation apparatus 10. A stationary channel member 12 is preferably placed in a stable position on a base, or fixedly mounted to such a base in a preferably horizontal position, with the channel opening 13 facing upward. Such horizontal positioning helps to keep the effects of gravity on the translation apparatus symmetrical. The longitudinal sidewalls 14a, b include interior planar parallel bearing surfaces 15a, b, and the sidewalls are preferably stably connected together, such as by a central connecting plate portion 16, having a central opening 19 therethrough, and upon which the translational drive assembly 17 rests. The sidewalls need not be parallel or planar. Opposing concave bearing surfaces would be useful in retaining the translation drive assembly, as would sidewalls angling inwardly. Other sidewall configurations, such as grooving, may also be useful, but generally increase the costs and difficulty of machining the sidewalls of the channel members. The channel member may even have sidewalls which are adjustably connected together, such as by bolts, for fine adjustment of tolerances.

The translation drive assembly includes a front primary clamping leg 18a, and a rear primary clamping leg 18b, consisting of a mounting or connector bar 20a and 20b, respectively, and expansion or drive members 22a, b, c, d which may be any common electromechanical transducers, and which are preferably piezoelectric ceramic stacks mounted within bores in the mounting bars, preferably with epoxy cement. Each of the clamping piezoelectric stacks include precisely machined feet 23a, b, c, d, which are currently also preferably formed with epoxy cement, at the exterior ends of the stacks extending to the bearing surfaces of the stationary channel member. Although the primary expansion or drive members are illustrated as being symmetrically positioned in the mounting bars, in pairs, the primary clamping drive members would function similarly if only one front piezoelectric stack and one rear piezoelectric stack were provided. The one-dimensional translation drive assembly also includes a central body 24, preferably having a central opening 25, and four center piezoelectric ceramic stack members 26a, b, c, d coupling the primary clamping mounting bars to the central body by expoxy bonds 27a, b, c, d,. Although expoxy cement is currently preferred, other bonds, such as adhesive or mechanical fasteners would of course, be suitable. The piezoelectric ceramic stack members will expand when subjected to an electrical current, such as is well known in the art. Typically, modern multilamellar piezoelectric ceramics expand approximately 10 microns when subjected to 70-80 volts of electricity, allowing for up to 10 microns per step of the channel walker translation assembly. Smaller steps may be taken by reduction of the applied voltages. For simplicity, the electrical connections to the piezoelectric stacks are only illustrated in the electrical circuit diagrams. As will be readily appreciated, the channel members can be machined as one piece to have extremely flat, smooth, parallel sidewalls and a smooth base connecting portion which the translation "channel walker" assembly can negotiate with extremely high resolution.

Figure 2:
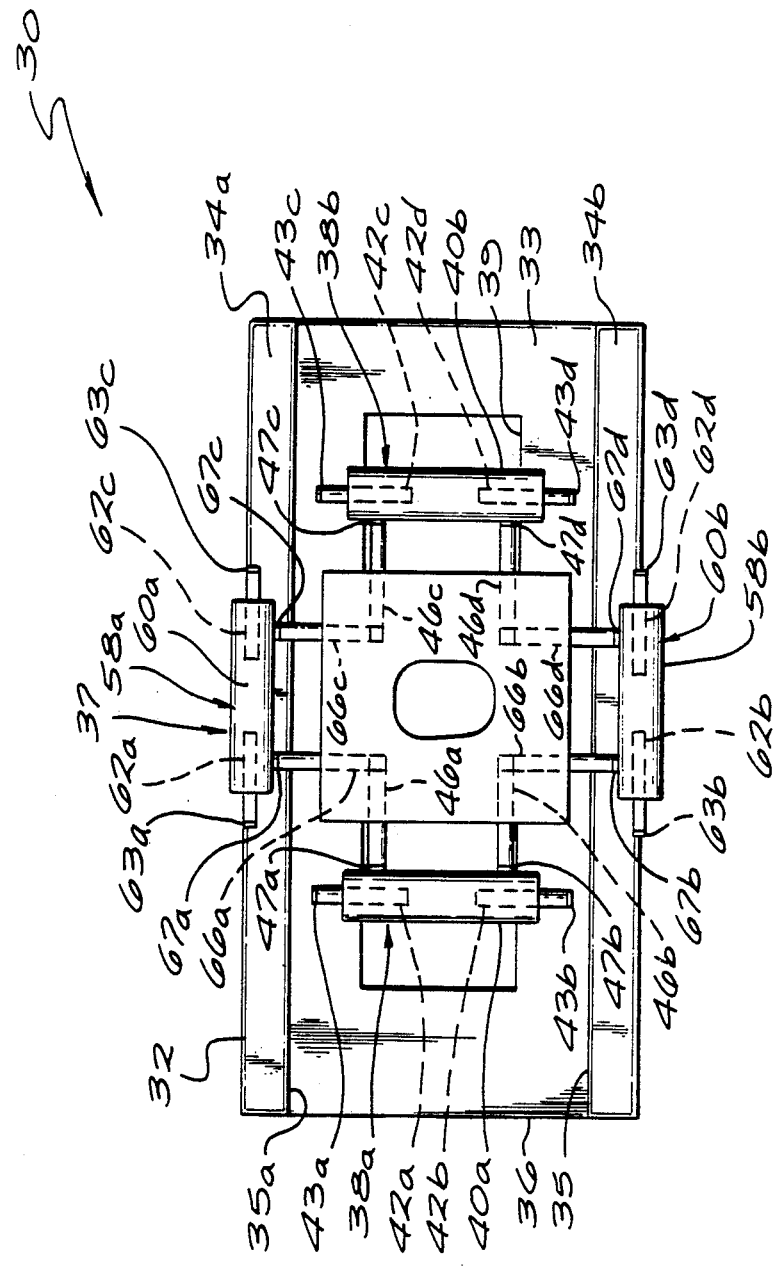
FIG. 2 is a top plan view of a second embodiment, including a movable channel for two-dimensional translational motion.
Figure 3:
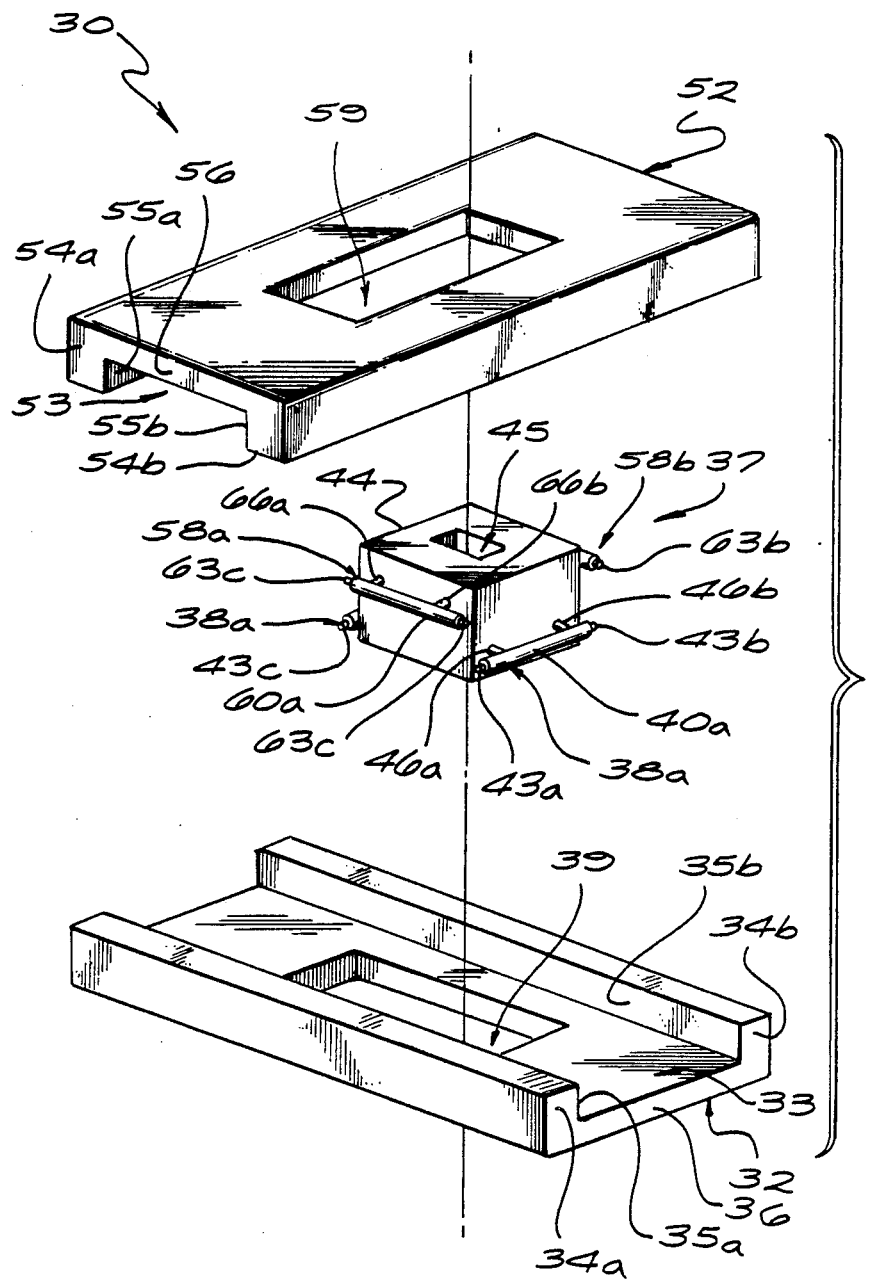
FIG. 3 is a perspective view of the embodiment of FIG. 2.

The one-dimensional translation apparatus of FIG. 1 can be configured to provide a two dimensional translation stage, as is illustrated in FIGS. 2 and 3. The construction of the lower portion of the two-dimensional translational apparatus 30 is essentially the same as for the one dimensional translation apparatus described above. A stationary channel member 32 is provided, having a channel opening 33 facing upward between two planar sidewalls 34a, b, presenting planar interior parallel bearing surfaces 35a, b, and the base connecting plate portion 36 between the sidewalls carries the translation assembly 37.

The two dimensional translation assembly includes the front and rear clamping legs 38a, b, which include front and rear connector mounting bars 40a, b, and the front and rear pairs of piezoelectric drive members 42a, b, c, and d in bores in the mounting bars, with the external feet 43a, b, c, d mounted thereon. The central body portion 44, which includes the central opening 45 therethrough, carries the four central piezoelectric ceramic stack members 46a, b, c, d, and corresponding epoxy bonds 47a, b, c, d coupling the front and rear connector bars to the central body.

Figure 5:
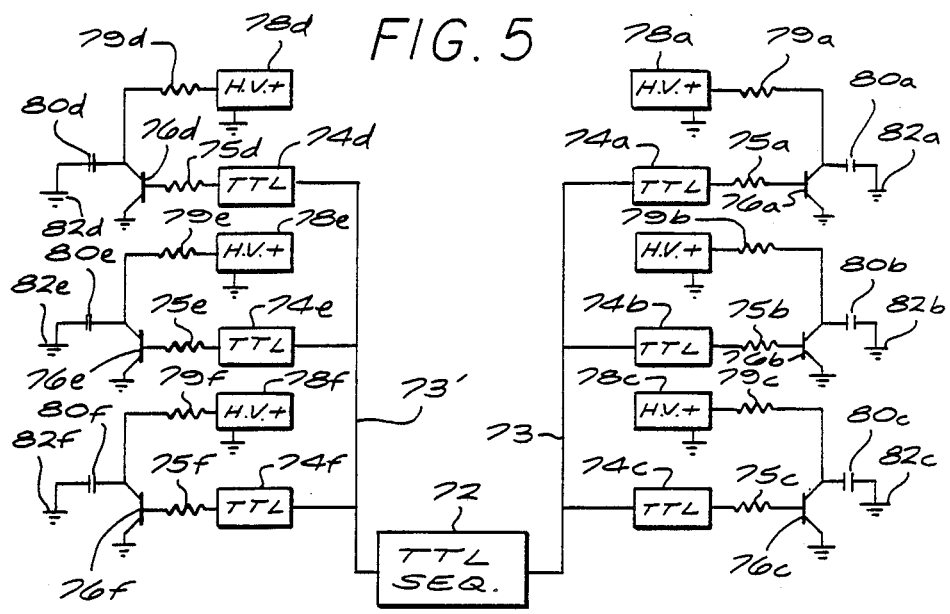
FIG. 5 is an electrical schematic diagram of a sequencer circuit for driving the two-dimensional translator of FIG. 2.

The upper movable channel member 52 has a construction similar to that of the lower stationary channel member, and includes channel opening 53 between planar sidewall portions 54a, b, having opposite interior planar parallel bearing surfaces 55a, b, connected together by the central base connecting plate portion 56, which also includes a central opening 59. The combination of the lower channel member opening 39, the translation assembly opening 45, and the upper, movable channel member opening 59 permits light to pass through these openings, so that the translation apparatus may be used as a stage for an optical microscope. The upper clamping drive legs 58a, b, are mounted to the central body perpendicular to the lower clamping drive legs, and include connector bars 60a, b, having the piezoelectric ceramic stack drive members 62a, b, c, d, mounted in bores in the ends of the connecting bars and the feet 63a, b, c, d mounted externally on the ends thereof. The upper central piezoelectric drive members 66a, b, c, d, and corresponding bonds 67a, b, c, d couple the upper clamping drives to the central body. The upper movable channel member is placed over and carried by the central body, with the upper clamping drive legs extending between the inner sidewall bearing surfaces of the movable member. Each of the piezoelectric ceramic stack members is individually and selectively actuatable to expand to provide the motile source for the clamping and extending functions of the translation drive assembly. The basic electrical connections to the piezoelectric ceramic stack members for the two-dimensional translation apparatus are illustrated in FIG. 5 for simplicity.

Figure 4:
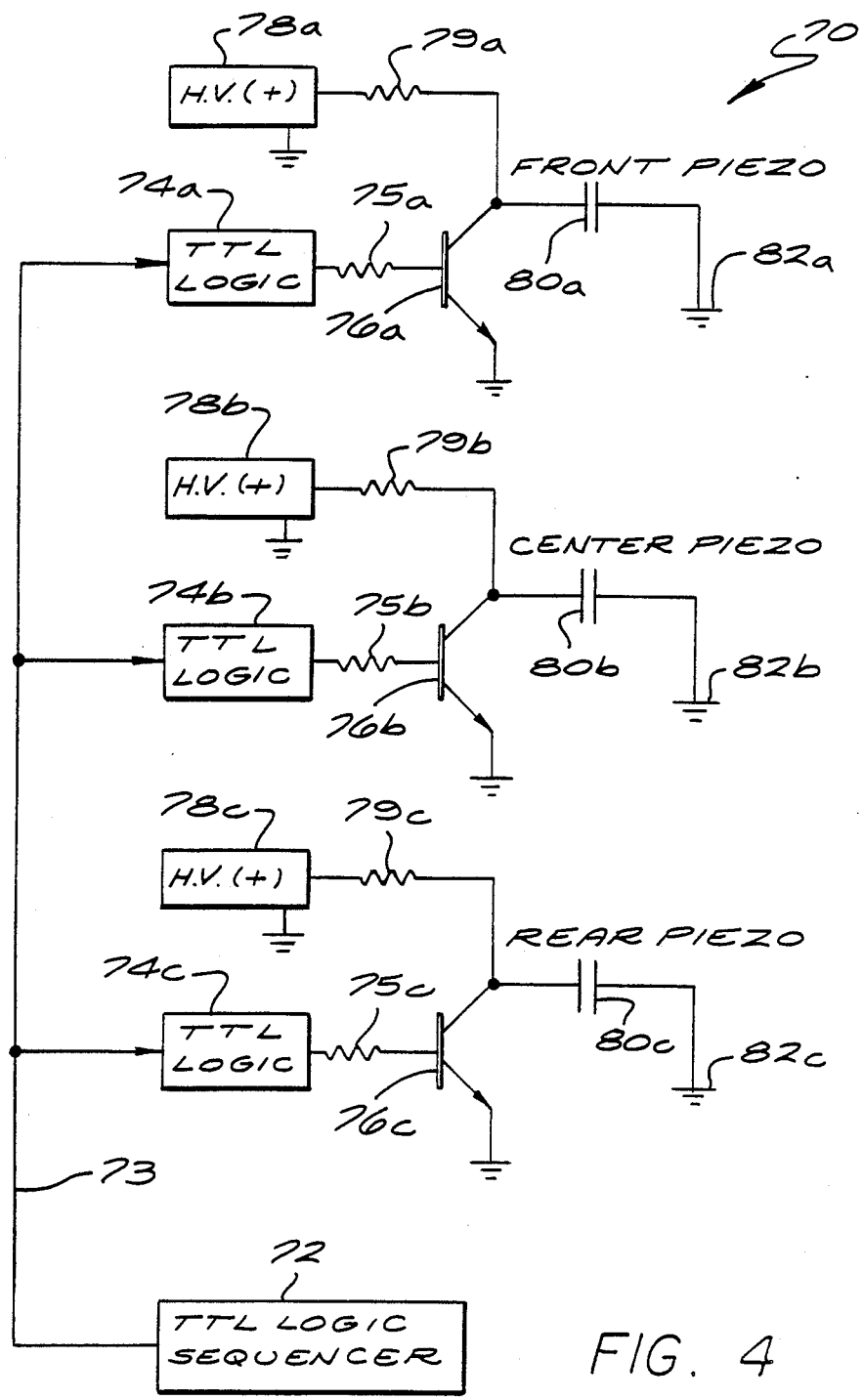
FIG. 4 is an electrical schematic diagram of a sequencer circuit for driving the translation apparatus of FIG. 1.

To illustrate and exemplify the electrical circuitry by which each of the piezoelectric ceramic stack members of a one-dimensional translator is individually selectable for expansion and contraction, a simple electrical schematic diagram is presented in FIG. 4, for a simple case in which a translation drive assembly includes single front and rear piezoelectric stack members for clamping action of the translation drive device, and one central piezoelectric member for the extension movement. It is possible that these three simple piezoelectric would also be symmetrically arranged to form a simple one dimensional translational drive device, with the central piezoelectric member coupling the front rear piezoelectric. Alternatively, the schematic can be viewed as directing control voltage signals to front, rear and central groups of piezoelectric drive members. Thus, in this form of the invention, the piezoelectric drive circuit 70 would include a TTL logic sequencer 72, generating electrical control signals conducted by the electrical line 73 to the TTL logic devices 74a, b, c. Each of the TTL logic devices is connected through a resistor 75a, b, c, to a transistor switch 76a, b, c, coupling a high voltage source 78a, b, c, through resistor 79a, b, c, which can be a variable resistor, to the piezoelectric drive member 80a, b, c, connected to ground 82a, b, c. A slightly more complicated electrical schematic diagram is illustrated in FIG. 5 for the embodiment in which there are upper piezoelectric clamping and extending members, carrying and translating the upper movable channel member, and in which corresponding elements are identified with reference numerals corresponding to those in FIG. 4.

Figure 6:
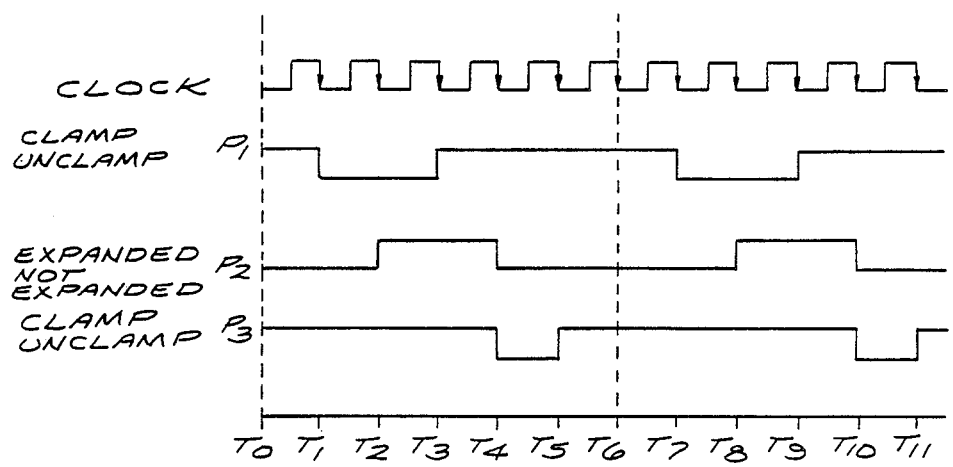
FIG. 6 is a timing diagram of the logic sequencing for stepwise movement of the translator of FIG. 1.

With reference to a one dimensional translational assembly and the simplest electrical sequencing circuitry illustrated in FIG. 4, the operation of the logical sequencing of a translation device for linear movement will now be described, further with reference to the timing diagram in FIG. 6. The timing diagram illustrates a typical sequencing for movement in the direction of the front piezoelectric member. At $T_0$ the front and rear piezoelectric members are clamped, and the central piezoelectric member is unextended, holding the translation device in a stable position. At $T_1$, the front piezoelectric member is unclamped, preparing for extension of the central piezoelectric members at $T_2$, which moves the front piezoelectric leg in a forward direction. At $T_3$ the front piezoelectric drive leg having reached its full extension, again clamps. At $T_4$, the rear piezoelectric drive leg unclamps, in unison with the contraction of the central piezoelectric member to bring the rear piezoelectric member along in the forward direction. The rear piezoelectric member again clamps at $T_5$ to secure the translation assembly in a stable position, further forward in the stationary channel member. The logical sequencing steps may be again repeated at $T_7$ through $T_{11}$, for continued forward movement, or the steps may be reversed, for rearward movement. It should be readily apparent that similar logical sequencing for the two-dimensional translator embodiment for clamping, unclamping and extending the upper drive legs which are perpendicular to the lower drive legs, will also serve to provide translational motion of the upper movable channel member.

The upper movable channel member can thus be caused to move in a series of extremely fine rectilinear steps, typically 10 microns or less, for two-dimensional positioning of an object carried on the upper movable channel member, such as a stage for microscopes or other types of high resolution targeting devices.

Figure 7:
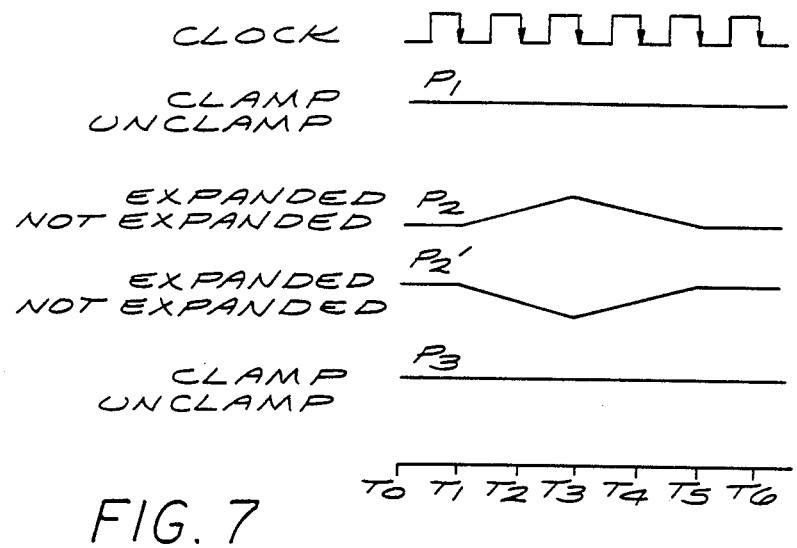
FIG. 7 is a timing diagram for fine scanning movement of the translator of FIG. 1.
Figure 8:
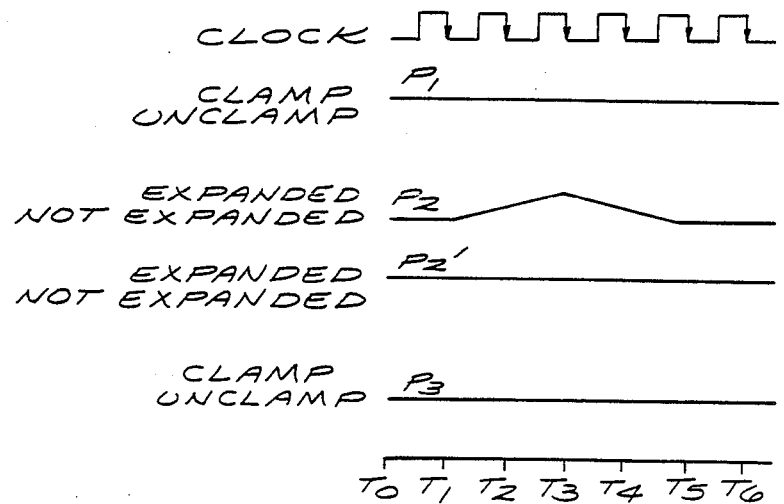
FIG. 8 is an alternative timing diagram for fine scanning movement of the translator of FIG. 1.

Referring to FIGS. 7 and 8, a particularly advantageous method of operating the translating device in the stationary channel for a gradual one-dimensional scanning motion, or further translating the movable channel member to allow a very fine, gradual two-dimensional scanning pattern, involves the clamping of at least one leg in each pair of opposing legs, and ramping the voltage to at least one of the central piezoelectric stacks. FIG. 7 illustrates the timing diagram for clamping a front leg $P_1$ and a rear leg $P_3$, gradually increasing and decreasing the voltage to gradually expand and contract a front central piezoelectric stack while simultaneously decreasing and increasing the voltage to gradually contract and expand a rear central piezoelectric stack in an opposing, coordinated manner, causing the central body to smoothly scan back and forth. Two-dimensional raster scanning of the upper movable channel can be achieved by combining a similar scanning pattern of the front and rear legs, or of the upper central piezoelectric stacks with the scanning pattern of the lower portion.

The timing diagram illustrated in FIG. 8 provides for clamping of only one leg while the other opposing leg is unclamped for free movement, and in this case only one central piezoelectric stack would be activated for gradual expansion and contraction. The kind of scanning pattern shown in FIG. 8 could be used to generate a linear scanning motion of the translator device along the stationary channel member, and could be combined with a scanning pattern generated for the upper movable channel member according to a timing sequence such as is shown in FIG. 7. The timing sequence of FIG. 7 would also be useful for generating a scanning motion of a more simplified form of the translator device having only one central piezoelectric stack for expansion and contraction in each dimension. Either form of the scanning pattern will be useful in generating infinite degrees of positional resolution.

From the foregoing it will be appreciated that the electromechanical piezoelectric translation apparatus of the invention provides a simple yet highly precise way of positioning objects, with a minimum of rotational and linear error in positioning of the objects. It is also significant that the surfaces of the channel members in the two-dimensional translator embodiment will not only present less total surface area to be machined than the total two-dimensional scanning area, to reduce the time and expense of machining in the manufacture of the bearing surfaces, but will also reduce the potential for positional errors due to imperfections in the surfaces.

Although specific embodiments of the invention have been described and illustrated, it is clear that the invention is susceptible to numerous modifications and embodiments within the ability of the those skilled in the art and without the exercise of the inventive faculty. Thus, it should be understood that various changes in form, detail and application of the present invention may be made without departing from the spirit and scope of the invention.

We claim:

1. An electromechanical translation apparatus, comprising:
   a channel member having opposing interior bearing surfaces; and
   a translation drive assembly disposed between said bearing surfaces, said drive assembly further comprising:
   at least first and second clamping members, each including a plurality of expansion members and extending in a first direction between said bearing surfaces;
   central drive means coupling said clamping members together, including at least one first central expansion member and at least one second central expansion member extending in a second direction perpendicular to said first direction; each of said expansion members being selectively actuatable to expand and contract response to electrical drive signals; a movable channel member having opposite interior bearing surfaces; said translation drive assembly being disposed between said movable channel member bearing surfaces and carrying said movable channel member;
   said central drive means further including at least one secondary expansion member extending in said first direction; and
   at least two secondary clamping drive members each extending in said second direction, and coupled together by said secondary central expansion member;
   whereby said movable channel member is capable of translational motion in said first and second directions.

2. The apparatus of claim 1, wherein said movable channel member includes a central plate portion extending between said interior bearing surfaces, said central plate portion including an opening therethrough.

3. An electromechanical translation apparatus, comprising:
   a channel member having opposing interior bearing surfaces;
   a translation drive assembly disposed between said bearing surfaces, including at least two primary clamping members each including at least one expansion member and extending in a first direction between said bearing surfaces; and central drive means coupling said primary clamping members together and including at least one expansion member extending in a second direction perpendicular to said first direction; each of said expansion members being selectively actuatable to expand and contract responsive to electrical drive signals;
   a movable channel member having opposing interior bearing surfaces;
   said translation drive assembly being disposed between said movable channel member bearing surfaces and carrying said movable channel member;
   said central drive means further including at least one secondary expansion member extending in said first direction; and
   at least two secondary clamping expansion members each extending in said second direction, and coupled together by said secondary central expansion drive member;
   whereby said movable channel member is capable of translational motion in said first and second directions.

4. The apparatus of claim 3, wherein said clamping members each comprise a mounting member including at least one piezoelectric transducer means having an exterior end portion disposed adjacent one of said bearing surfaces.

5. The apparatus of claim 3, wherein said primary clamping members comprise first and second mounting members each including a pair of expansion members having exterior end portions disposed on opposite sides of said first and second mounting members adjacent said stationary channel member bearing surfaces; and said secondary clamping members comprise first and second side mounting members each including a pair of expansion members having exterior end portions disposed on opposite sides of said first and second side mounting members adjacent said movable channel member bearing surfaces.

6. The apparatus of claim 5, wherein said central expansion means includes at least one first central expansion member coupled to said first mounting member, at least one second central expansion member coupled to said second mounting member, at least one first side central expansion member coupled to said first side mounting member, and at least one second side central expansion member coupled to said second side mounting member.

7. The apparatus of claim 3, including means for generating said electrical drive signals operatively connected to each of said expansion members for selectively actuating each said expansion member according to a predetermined sequence of voltage changes.

* * * * *